(12) United States Patent
Pham

(10) Patent No.: US 11,430,039 B1
(45) Date of Patent: Aug. 30, 2022

(54) METHOD FOR ASSIGNING UNIVERSAL CONSUMER IDENTIFICATION (UCID) AND CREATING NON-PERSONALLY IDENTIFIABLE PROFILE TO PROPOSE SUITABLE PRODUCTS AND SERVICES

(71) Applicant: Hau Pham, San Diego, CA (US)

(72) Inventor: Hau Pham, San Diego, CA (US)

(*) Notice: Subject to any disclaimer, the term of this patent is extended or adjusted under 35 U.S.C. 154(b) by 277 days.

(21) Appl. No.: 16/159,702

(22) Filed: Oct. 14, 2018

(51) Int. Cl.
  G06Q 30/06 (2012.01)
  G06K 7/14 (2006.01)

(52) U.S. Cl.
  CPC ....... *G06Q 30/0631* (2013.01); *G06K 7/1417* (2013.01); *G06Q 30/0609* (2013.01)

(58) Field of Classification Search
  CPC .......... G06Q 30/0609; G06Q 30/0631; G06K 7/1417
  See application file for complete search history.

(56) References Cited

U.S. PATENT DOCUMENTS

| | | | |
|---|---|---|---|
| 8,255,291 B1 | 8/2012 | Nair | |
| 8,626,602 B2 | 1/2014 | George | |
| 10,169,786 B2* | 1/2019 | Nevada | G06Q 30/0601 |
| 10,448,211 B1* | 10/2019 | Shen | H04W 4/023 |
| 2001/0054008 A1* | 12/2001 | Miller | G06Q 30/0251 705/26.1 |
| 2003/0018522 A1 | 1/2003 | Denimarck et al. | |
| 2003/0216928 A1* | 11/2003 | Shour | G06Q 30/02 705/2 |
| 2005/0097005 A1 | 5/2005 | Fargo | |
| 2009/0187466 A1 | 7/2009 | Carter et al. | |
| 2009/0254971 A1* | 10/2009 | Herz | G06Q 30/0603 726/1 |
| 2012/0203605 A1* | 8/2012 | Morgan | G06Q 20/322 705/14.17 |
| 2014/0040041 A1* | 2/2014 | Ohnemus | G06Q 30/0222 705/14.66 |
| 2014/0143055 A1 | 5/2014 | Johnson | |
| 2014/0143096 A1* | 5/2014 | Stubert | G06T 11/00 705/26.63 |

(Continued)

OTHER PUBLICATIONS

BHIM app top-ranked on google play, but how well is it working? (Jan. 2, 2017). Mint Retrieved from https://dialog.proquest.com/professional/docview/1854577856?accountid=131444.*

(Continued)

*Primary Examiner* — Michelle T Kringen
(74) *Attorney, Agent, or Firm* — Tram Do, Esq.

(57) ABSTRACT

Computer systems, methods, and apparatuses that use granular specifications and non-personally identifiable information provided by a consumer and a third party to suggest suitable products and services utilizing the Universal Consumer Identification Systems (UCIS) and subsystems. The Universal Consumer Identification (UCID) is assigned to each registered consumer to maintain privacy and to create a unique profile for the UCIS to present relevant products and services to a consumer on a personal computer, laptop, smart phone, smart watch, and other smart devices with electronic notifications or visual and audible alerts via a battery-powered wireless Universal Smart Alert (USA) apparatus at any physical location in the world that third parties are participated.

2 Claims, 21 Drawing Sheets

(56) References Cited

U.S. PATENT DOCUMENTS

| | | | | |
|---|---|---|---|---|
| 2014/0214587 A1* | 7/2014 | Rohm | ............... | G06Q 30/0643 |
| | | | | 705/26.5 |
| 2014/0358738 A1* | 12/2014 | Ohnemus | ........... | G06Q 30/0601 |
| | | | | 705/27.2 |
| 2016/0210602 A1* | 7/2016 | Siddique | .............. | G06Q 20/384 |

OTHER PUBLICATIONS

MySize's SizeUp app gains traction among consumers—SECFilings.com. (May 1, 2017). Internet Wire Retrieved from https://dialog.proquest.com/professional/docview/1895264150?accountid=131444.*

A Method for Intelligently Recommending Nearby Product/Service Based on Paper Receipt in Real World; An IP.com Prior Art Database Technical Disclosure; Authors et al.: Disclosed Anonymously; IP.com No. IPCOM000239391D; IP.com Electronic Publication Date: Nov. 5, 2014 (Year: 2014).*

* cited by examiner

FIG. 5

At Manufacturers, Distributors, Wholesalers, Retailers, Businesses
Product / Service Registration form:

| Field | |
|---|---|
| Product / Service ID: | ← 244 |
| Product / Service category: | ← 246 |
| Description: | ← 248 |
| Gender: | ← 250 |
| Age: | ← 252 |
| Hat size: | ← 254 |
| Neck size: | ← 256 |
| Shoulder size: | ← 258 |
| Sleeve size: | ← 260 |
| Calf size: | ← 262 |
| Bicep size: | ← 264 |
| Forearm size: | ← 266 |
| Wrist size: | ← 268 |
| Ring size: | ← 270 |
| Chest/Bust size: | ← 272 |
| Waist size: | ← 274 |
| Hip size: | ← 276 |
| Back neck to waist size: | ← 278 |
| Rise size: | ← 280 |
| Inseam size: | ← 282 |
| Thigh size: | ← 284 |
| Foot size: | ← 286 |
| Submit button | ← 288 |

FIG. 8

METHOD FOR ASSIGNING UNIVERSAL CONSUMER IDENTIFICATION (UCID) AND CREATING NON-PERSONALLY IDENTIFIABLE PROFILE TO PROPOSE SUITABLE PRODUCTS AND SERVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, A COMPUTER PROGRAMING LISTING COMPACT DISC APPENDIX

Not Applicable

BACKGROUND OF THE INVENTION

This invention relates to commerce of products and services at physical or over the internet shops, businesses by utilizing a computer system, method, and apparatus.

Traditional methods of buying a product or a service typically requires consumers to go through a time-consuming process and much efforts. This is a hypothetical scenario of a male consumer who tries to buy a shirt at a physical store. He visits a store, then goes to the appropriate section to find a shirt. The shirts are usually classified into generic categories such as extra-small, small, medium, large, extra-large, slim, and regular. According to his previous shopping experience, he goes through a rack of shirts and select the medium size shirt that may or may not fit him. He then tries the shirt on inside the fitting room. Unfortunately, the shirt is a bit tight. He puts his own shirt back on, leaves the store's shirt in the fitting room for the staff to collect and reshelf. He returns to the clothes rack to find a large size shirt that may fit him in the second attempt. The method of trial and error to find a suitable shirt is similar for other products such as pants, dresses, jackets, suits, hats, shoes and other wardrobes.

Different clothing brands make shirts in various measurements. For instance, brand A may have longer sleeves and smaller waist than brand B, however, both shirts are labeled as medium size. Shirts made in one country may not have the exact sizes as those are made in another county. Even shirts are made by the same brand may be varied in sizes in different batches or designs. The variations are multiplied if other measurements such as neck size, chest size, waist size, hip size, inseam size, and so forth are factored in.

Human anatomies are varied between each individual. Not all consumers who have the same age, gender, or height would have similar physiques. Some consumers may have longer arms and bigger biceps than others. Some consumers may have larger hips and longer legs. However, the consumers have not been provided with a granular, precise, and intuitive system to resolve issues as illustrated in the above hypothetical example of an outdated process of selecting and buying a shirt.

Electronic commerce or online shopping has become an important alternative for the consumers to shop. The consumers do not need to waste valuable time and gas by being stuck in traffic or to find parking at the malls. Yet, the consumers have to deal with even more challenging issues with online purchases than at the physical stores when look for merchandises that match their physiques. The consumers are required to select their gender, product's category, sub-category, style, size. The consumers cannot try out the shirts, pants, or dresses for fitness until the merchandises are delivered to their homes. The consumers have to return the merchandises to the sellers if they do not fit. As a result, the consumers have wasted valuable time and resources in this transaction. The sellers have incurred losses of valuable resources to process the order and shipping costs as a result of the unsuccessful transactions.

The consumers face similar challenges when look for services. The consumers have to search for services in business directories, or online searches. It is a time-consuming process to find an active business with the service that matches the consumers' need in real-time. The merchants have been challenged with a realistic and efficient method of stocking the right merchandises.

Another issue with commerce and electronic commerce transactions often involves sensitive and private information such as name, address, phone number, date of birth, social security number, and credit card number are being accessed, intercepted, collected, transferred and stored in a credit card transaction. Personally-identifiable financial and non-financial information may be intercepted or hacked by an unauthorized party to be used for illegitimate purposes such as creating false identity or making unauthorized purchases or withdrawals.

SUMMARY OF THE INVENTION

The present invention comprises of computer systems, methods, and apparatuses that provide secure and efficient means to solve issues related to commerce and electronic commerce transactions. The Universal Consumer Identification Systems (UCIS) registers granular and specific information of a consumer to create a unique Universal Consumer Identification (UCID) profile to be globally recognized by participated partners.

The partners register products, services information using identical specifications in their systems as each product, service is created and added to their databases. Furthermore, the partners may use the information provided by the consumers via the UCIS to produce products and to provide services that are popular or in high demands.

UCIS comprises a combination of machine, method, and apparatus to automatically match the consumer's profile with products, services in order to suggest suitable products, services to the consumer in real-time and to request suitable products to the merchants, distributors, producers and services providers. Notifications of suitable products, services are sent to the consumer via text message, e-mail, and mobile application.

The consumers can also actively use their UCID to initiate the search for interested products, services by scanning their unique UCID in the form of Quick Response (QR) code at any participated partner who is equipped with a QR code reader. The result of the matching products, services are sent to a power-operated apparatus called Universal Smart Alert (USA) to notify the consumer with a sound from a built-in speaker and/or light of a surface-mount light emitting diode (LED).

Alternatively, the consumer may determine a suitable product or service by using the UCIS mobile application to scan a non-power operated Universal QR (UQR) Tag that is affixed to a merchandise or associated with a service. The UCIS mobile application would determine whether or not a scanned UQR Tag on that merchandise or service is a match to the profile of the consumer.

With electronic commerce or online transactions, the consumer may register or login with the assigned credential using a mobile application on a smart mobile device or a web browser on a personal computer, tablet, or laptop. The consumers are automatically presented with relevant and suitable products, services after logging into the account in the UCIS or by using the UCID as the login credential after signing in to the third party's system. The application programming interfaces (API) between the UCIS and the third parties provide a mechanism for suggesting most relevant products, services that match the consumers' profile according to the provided information and preferences.

The UCID is the secure identity of the consumer. The UCID associates with a non-personally identifiable profile yet comprises specific and accurate information about the physique and services of each particular customer. In a financial transaction such as purchasing a merchandise, the UCID (first factor) and a random code (second factor) generated by the UCIS and sent to the consumer's smart device via text messaging, email, or mobile phone as a string of alphanumeric characters to authorize and confirm the transaction. The transaction is completed only when the random code is successfully verified by the consumer. The credit card is used only to pay for a product or a service that is typically required a photo identification or random code (third factor) to verify the identity of the credit card's holder before processing the payment. The credit card information and the credit card holder's private information goes directly between the business's and merchant's system and the credit card processor. No financial information is exchanged or stored at the UCIS. The third and independent factor of authentication in this hypothetical transaction provides an extra layer of security.

Other objects of the invention are described in the drawings below.

BRIEF DESCRIPTION OF THE DRAWINGS

FIG. 5 illustrates the exemplary non-limiting system, method, and apparatus of the registration process that receives granular data from consumer(s) to create unique Universal Consumer Identification (UCID) number and profile;

FIG. 8 illustrates the exemplary non-limiting system, method, and apparatus of the form for collecting granular data of product, service from third parties;

DETAILED DESCRIPTION OF THE INVENTION

Figure 1:
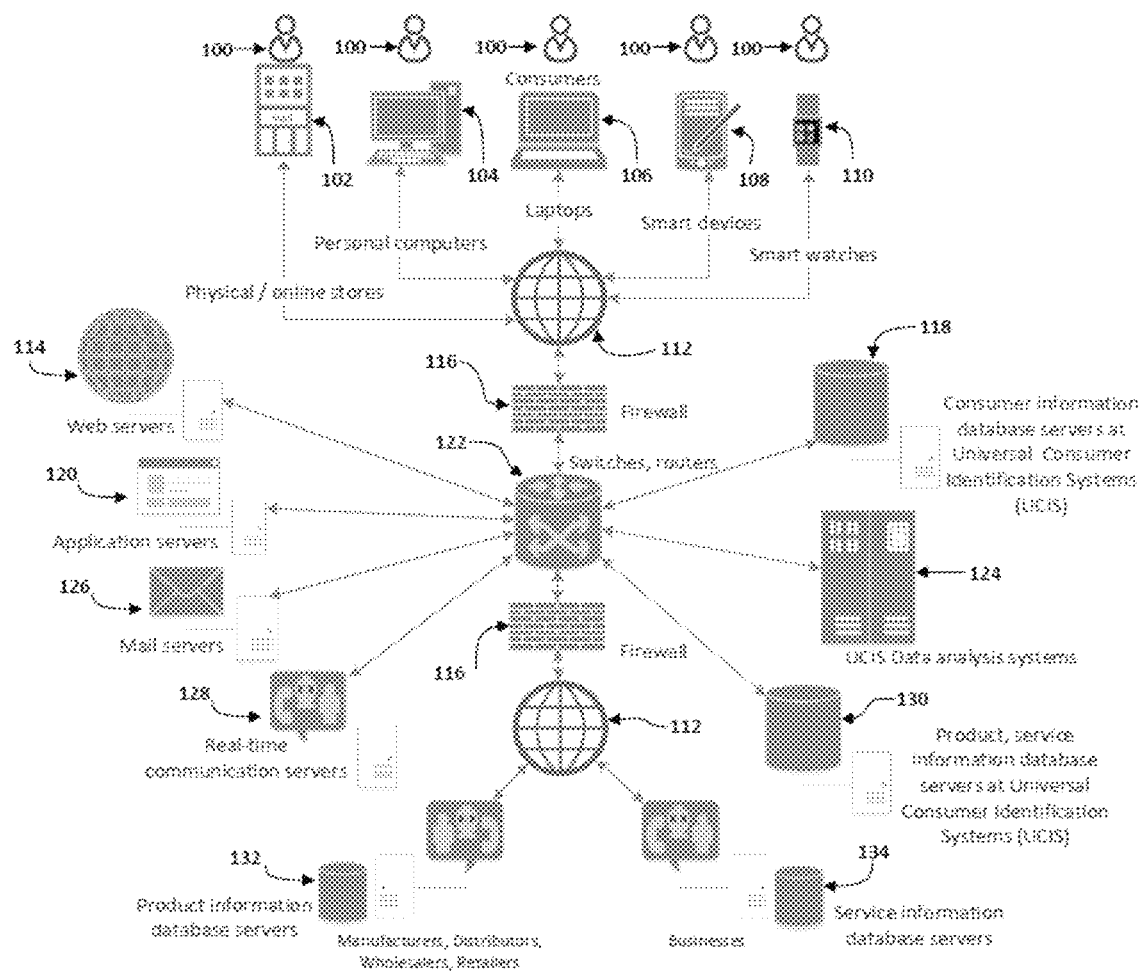
FIG. 1 illustrates the exemplary non-limiting system, method, and apparatus of the Universal Consumer Identification Systems (UCIS) in this invention.

The teachings of the present invention mentioned above only described specific examples that illustrate the advantageous features for having a universal and confidential identity in doing business at physical locations or over the Internet. It is to be understood that other embodiments may be applied and structured and functional modifications may be made without departing from the scope of the present invention. Any term that is expressed in the plural form herein may also include the singular form and vice versa, unless explicitly stated otherwise.

The term "alias", as used herein, refers to a name chosen by the consumer that allows him or her to register a unique identify.

The term "application programming interface", "API", as used herein, refers to a set of instructions, protocols, software, routines, programs, and applications to be processed by a computer and smart devices to perform specific functions.

The term "application server", as used herein, refers to computer systems that host software that can be used on mobile devices such as smartphones, smart devices.

The term "business computer system", as used herein, refers to web servers, application servers, mail servers, real-time communication servers, switches, routers, firewalls, wireless access points, and other electronic devices that are located at a third party that provide services to the consumers.

The term "computer", as used herein, refers to personal computers, mainframe computers, servers, systems, hardware, and thin clients that run special software to perform specific functions.

The term "commerce", as used herein, refers to business transactions at both online stores or shops, and physical locations, malls, stores, and shops.

The terms "communication", "information", "data", as used herein, refer to alphanumeric characters or binary (zero and one) numbers that are stored in databases or being transferred, processed by a computer to perform specific functions.

The terms "consumer", "registered consumer", as used herein, refer to persons, customers who are the legitimate users and may or may not be customers.

The terms "database", "database server", as used herein, refer to computer systems or subsystems that are used for storing data, information.

The terms "electronic commerce", "e-commerce", "online transaction", as used herein, refer to business transactions over the Internet.

The terms "element", "feature", as used herein, refer to information, record, field, column, data about a specific consumer, product, service that can be used to describe, identify, and distinguish its unique characteristics.

The term "firewall", as used herein, refers to computer systems and software to protect and prevent unauthorized users from accessing the UCIS.

The terms "interface", "software", "application", as used herein, refer to computer programs, applications, instructions, codes, communications that perform specific functions on computers, systems, and smart devices.

The term "item", as used herein, refers to merchandises, products, and services.

The terms "merchandise", "product", as used herein, refer to goods that are for sale at a store, shop and a business.

The term "mail server", as used herein, refers to computer systems that host software to allow the users to send and receive electronic mails (e-mails).

The term "process", as used herein, refers to computer programs, codes, instructions that perform specific functions.

The terms "quick response code", "QR code", as used herein, refer to an encoding algorithm to translate information into 2D graphical squares for fast, reliable reading and greater capacity for storing information.

The term "record", as used herein, refers to information, data, row, field that provide a detailed profile of products, services.

The term "real-time communication server", as used herein, refers to computer systems that provide instant communications such as text messages, electronic notifications to the users.

The term "record", as used herein, refers to information or data about a specific consumer, product, service that is stored in a database.

The term "retail computer system", as used herein, refers to web servers, application servers, mail servers, real-time communication servers, switches, routers, firewalls, wireless access points, and other electronic devices that are located at a third party that involves commerce and e-commerce transactions.

The term "smart device", as used herein, refers to smartphones, smart wearable devices, tablets, personal digital assistants, and other electronic devices.

The terms "switch", "router", as used herein, refer to network hardware and software to manage data packages being transferred in the systems.

The terms "third-party", "partner", "affiliate", as used herein, refer to manufacturers, distributors, wholesalers, retailers, merchants, businesses, and other affiliates who are not the consumers nor associated with the Universal Consumer Information Systems (UCIS).

The terms "Universal Consumer Identification card", "UCID card", as used herein, refer to a physical card that contains a UCIDQR code, a string of alphanumeric characters, a magnetic stripe, and a smart chip.

The terms "Universal Consumer Identification", "UCID", "UCIDQR code", as used herein, refer to a unique, confidential identification that associates with a consumer's profile in the form of UCIDQR code and a string of alphanumeric characters.

The terms "Universal Quick Response Tag", "Universal QR Tag", "UQR Tag", "UQRT", as used herein, refer to graphical UQR Tags to store specific information about a product and a service that can be read by QR scanners for UCIS to aggregate and analyze matching products and services.

The terms "Universal Smart Alert", "USA", as used herein, refer to a power-operated apparatus that triggers visual and audible alerts when a consumer is nearby a suitable item or when a consumer scans a UCIDQR code or UQR Tag.

The term "UCIS Data Analysis System", as used herein, refers to computer subsystems and software that perform algorithms to match a consumer's profile with a suitable product and service.

The terms "UCIS Computer Information system", "UCIS", as used herein, refer to database servers, web servers, application servers, mail servers, real-time communication servers, switches, routers, firewalls, processors, hardware, and other subsystems.

The term "web server", as used herein, refer to computer systems that host web pages that can be viewed by a web browser.

The term "wireless access point", as used herein, refer to electronic devices that allow wireless communications between computers, smart devices and systems using technologies such as Bluetooth, Near-Field Communication (NFC).

The system, method, apparatus referring to FIG. 1 presents an overview of the present invention that comprises the consumers 100 who can access the Universal Consumer Information Systems (UCIS) from a physical store, online store 102, or using personal computers 104, laptops 106, smart devices 108, and smartwatch 110. The UCIS comprises web servers 114, firewalls 116, switches and routers 122, consumer Information database servers 118, application servers 120, data analysis systems 124, mail servers 126, real-time communication servers 128. The product, service information database servers 130 in the UCIS exchange granular information with product information database servers 132 and service information database servers 134 from the third parties.

Figure 2:
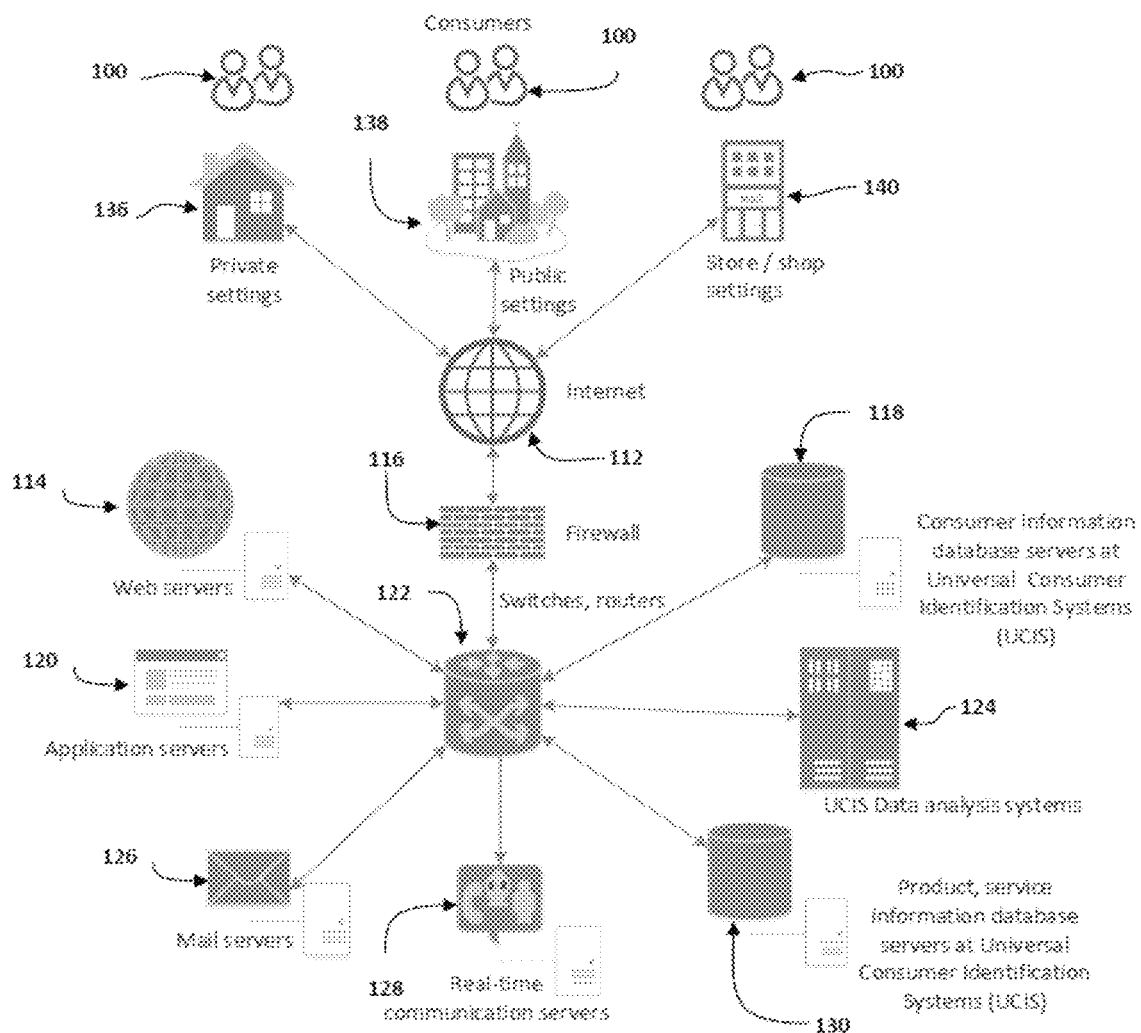
FIG. 2 illustrates the exemplary non-limiting system, method, and apparatus of the interactions between consumer(s) and Universal Consumer Identification Systems (UCIS) in various settings.

FIG. 2 illustrates the typical components of the UCIS in which the consumer 100 can access the UCIS from homes 136, at public places 138 such as parks, trains, streets, and at stores, shops, businesses 140. In a typical setting, the authorized consumer would use their preferable computer or smart device to access the Internet 112, and would pass through the firewalls 116, and switches, routers 122. Depending on which smart device that the consumer uses to access the consumer information database servers 118, UCIS data analysis system 124, and product, server information database servers 130, a suitable application is suggested to the consumer. For example, a web server 114 hosts a web application would be appropriate for the consumer who uses a web browser on a personal computer to access the UCIS. A mobile application which is hosted on an application server 120 would be more appropriate for the consumer who uses a smart device 108. Mail servers 126 and Real-time communication servers 128 may be used for both personal computer and mobile platforms.

Figure 3:
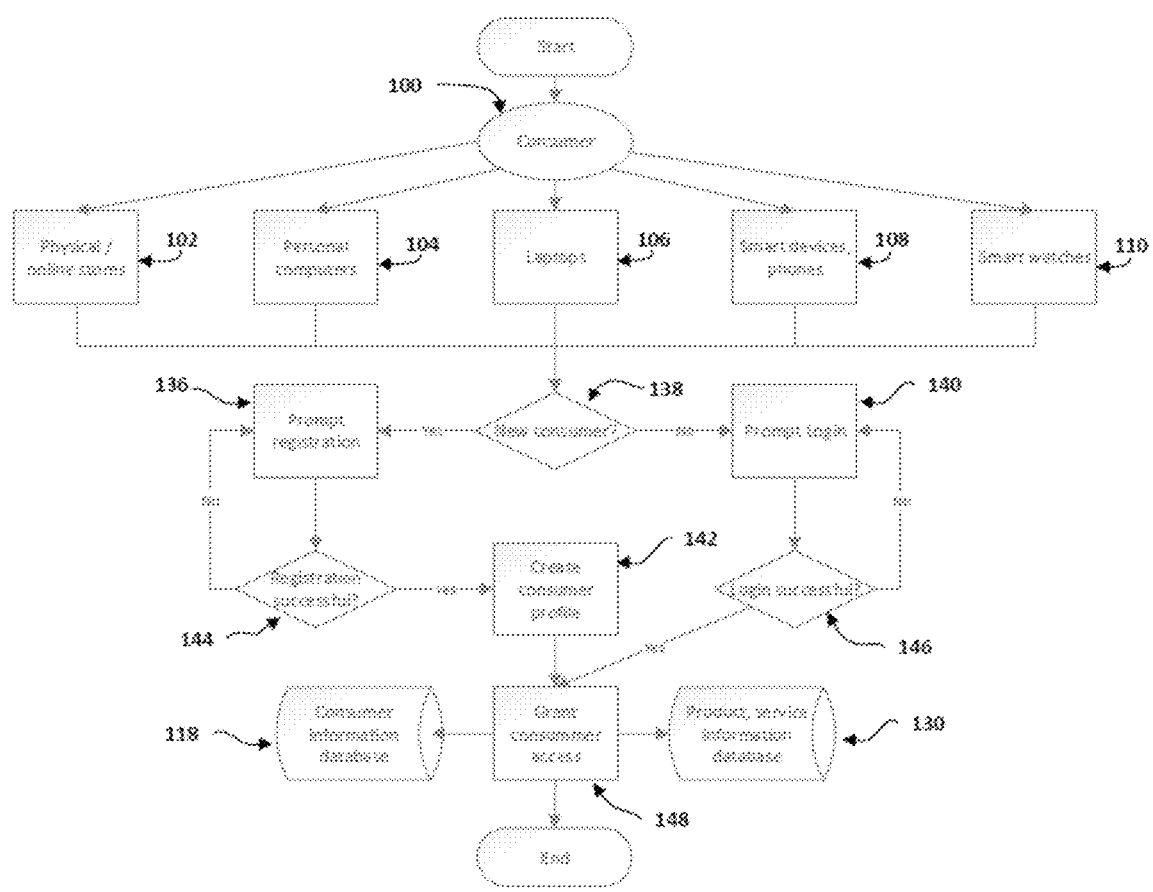
FIG. 3 illustrates the exemplary non-limiting system, method, and apparatus of the flowchart of the registration and access processes.

FIG. 3 illustrates a simplified flowchart that the consumers 100 may register or login the UCIS using their computers 104, laptops 106, smart devices 108, and smart watches 110 to access physical stores or online stores 102. The consumer is provided an option to register 136 or login 140 the UCIS. Once the consumer 100 is successfully registered 144, an account with a unique profile 142 is created and access to their own account in the consumer information databases 118 and product, services information databases 130 is granted 148. For returning consumer 100 who successfully logged in 146, they are granted access 158 to their own account in the consumer information databases 118 and product, service information databases 130.

Figure 4:
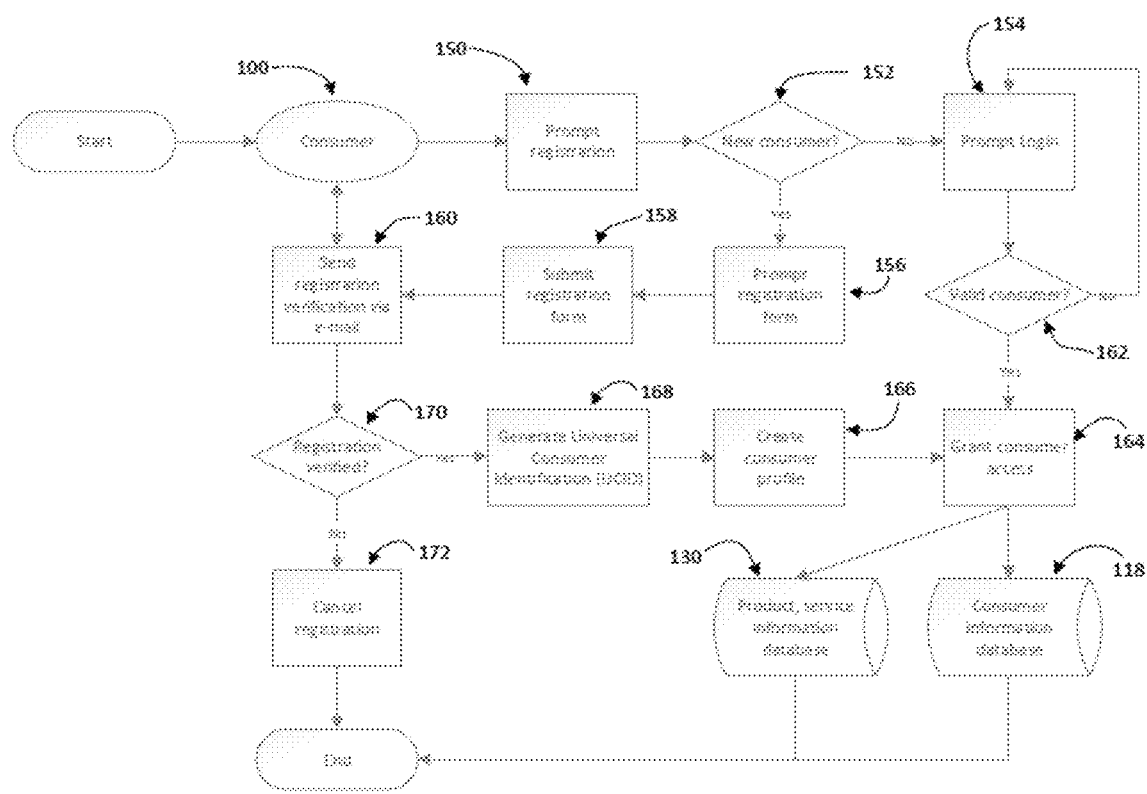
FIG. 4 illustrates the exemplary non-limiting system, method, and apparatus of detailed flowchart of the registration process with verification step and creation of Universal Consumer Identification (UCID) Number.

FIG. 4 illustrates a detailed flowchart that the consumer 100 is prompted an option 152 to register 150 or login 154. After the consumer finished filing and submitting 158 the registration form 156, an e-mail is automatically sent from the mail server 160 to the consumer's registered e-mail address to verify. After registration is verified 170, a universal consumer identification (UCID) 168 and profile 166 are created. After the consumer is validated 162, the registered consumer and the returning consumer are granted access 164 to the consumer information database servers 118 and product, service information database servers 130. The registration process is canceled 172 if the consumer does not confirm and verify via e-mail.

Figure 5:
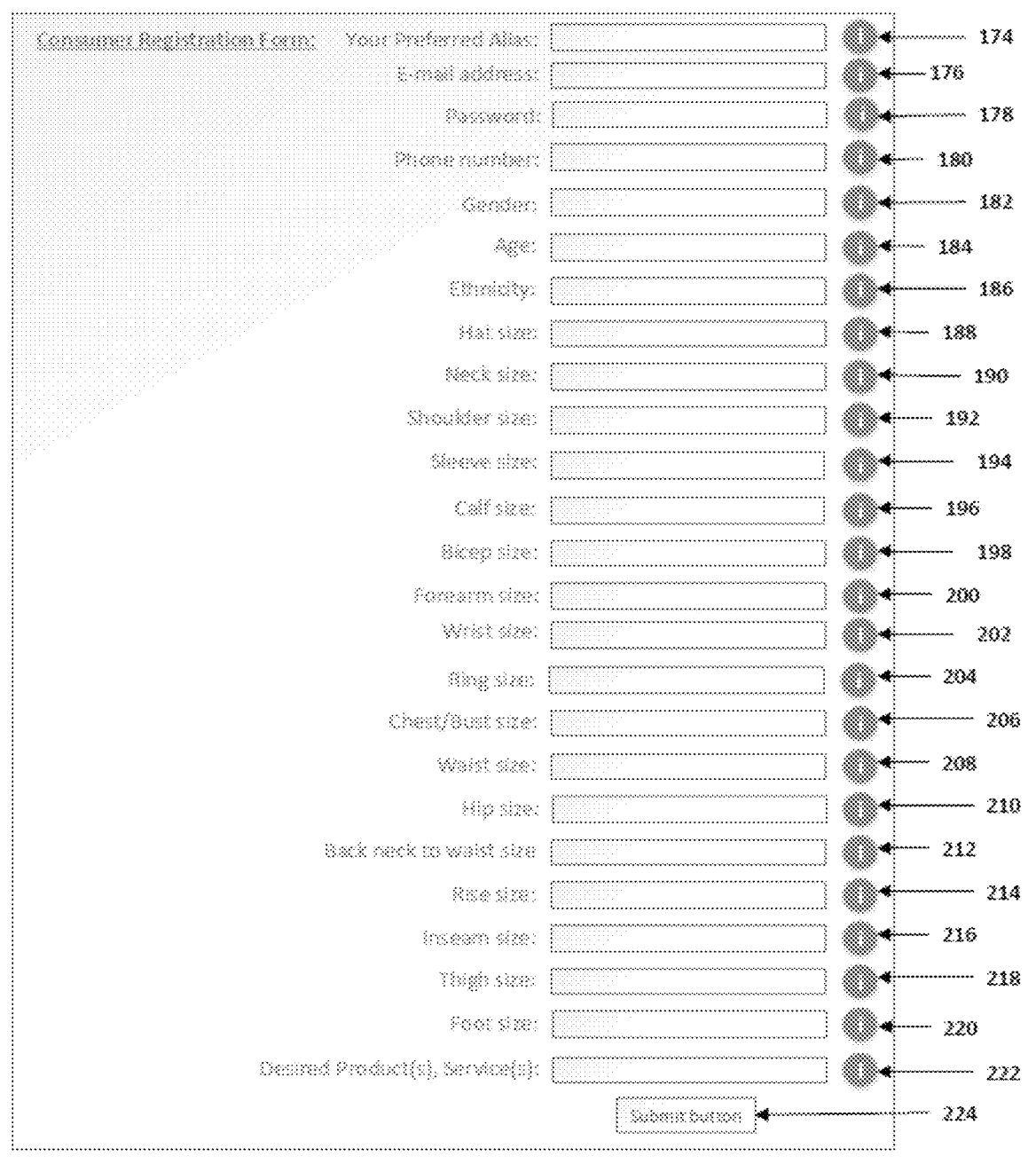

FIG. 5 illustrates the registration form 156 for the consumer 100 to enter elements of specific and non-personally identifiable information to submit 224 to the consumer information database servers 118 in the UCIS, which is indexed and categorized to include and differentiate at least:

| | |
|---|---|
| Your Preferred Alias | (174) |
| E-mail address | (176) |
| Password | (178) |
| Phone number | (180) |
| Gender | (182) |
| Age | (184) |
| Ethnicity | (186) |
| Hat size | (188) |
| Neck size | (190) |
| Shoulder size | (192) |
| Sleeve size | (194) |
| Calf size | (196) |
| Bicep size | (198) |
| Forearm size | (200) |
| Wrist size | (202) |
| Ring size | (204) |
| Chest/Bust size | (206) |
| Waist size | (208) |
| Hip size | (210) |
| Back neck to waist size | (212) |
| Rise size | (214) |
| Inseam size | (216) |
| Thigh size | (218) |
| Foot size | (220) |
| Desired Products, Services | (222) |

Figure 6A:
FIG. 6A illustrates the exemplary non-limiting system, method, and apparatus of the front view of the Universal Consumer Identification (UCID) Card.

FIG. 6A illustrates the front side 226 of the UCID card that contains alphanumeric UCID numbers 230 and in the form of Universal Consumer Identification Quick Response (UCIDQR) code 228 that is generated by process 168 in FIG. 4.

Figure 6B:
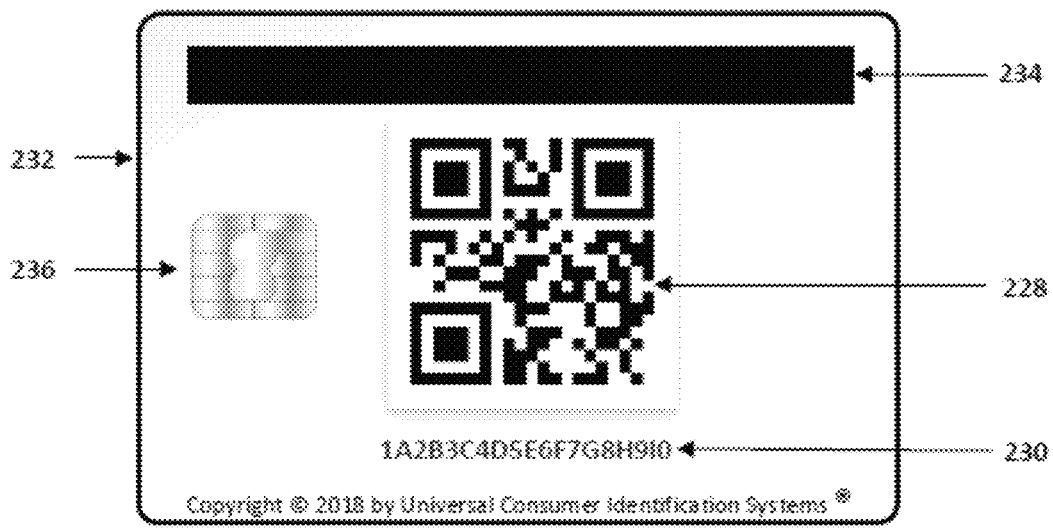
FIG. 6B illustrates the exemplary non-limiting system, method, and apparatus of the back view of the Universal Consumer Identification (UCID) Card.

FIG. 6B illustrates the back side 232 of the UCID card that comprises a magnetic stripe 234 and a smart chip 236 that contain the encoded UCID number 230 and relevant information in registration form 156 in FIG. 5, the UCIDQR code 228, and the UCID number 230.

Figure 7:
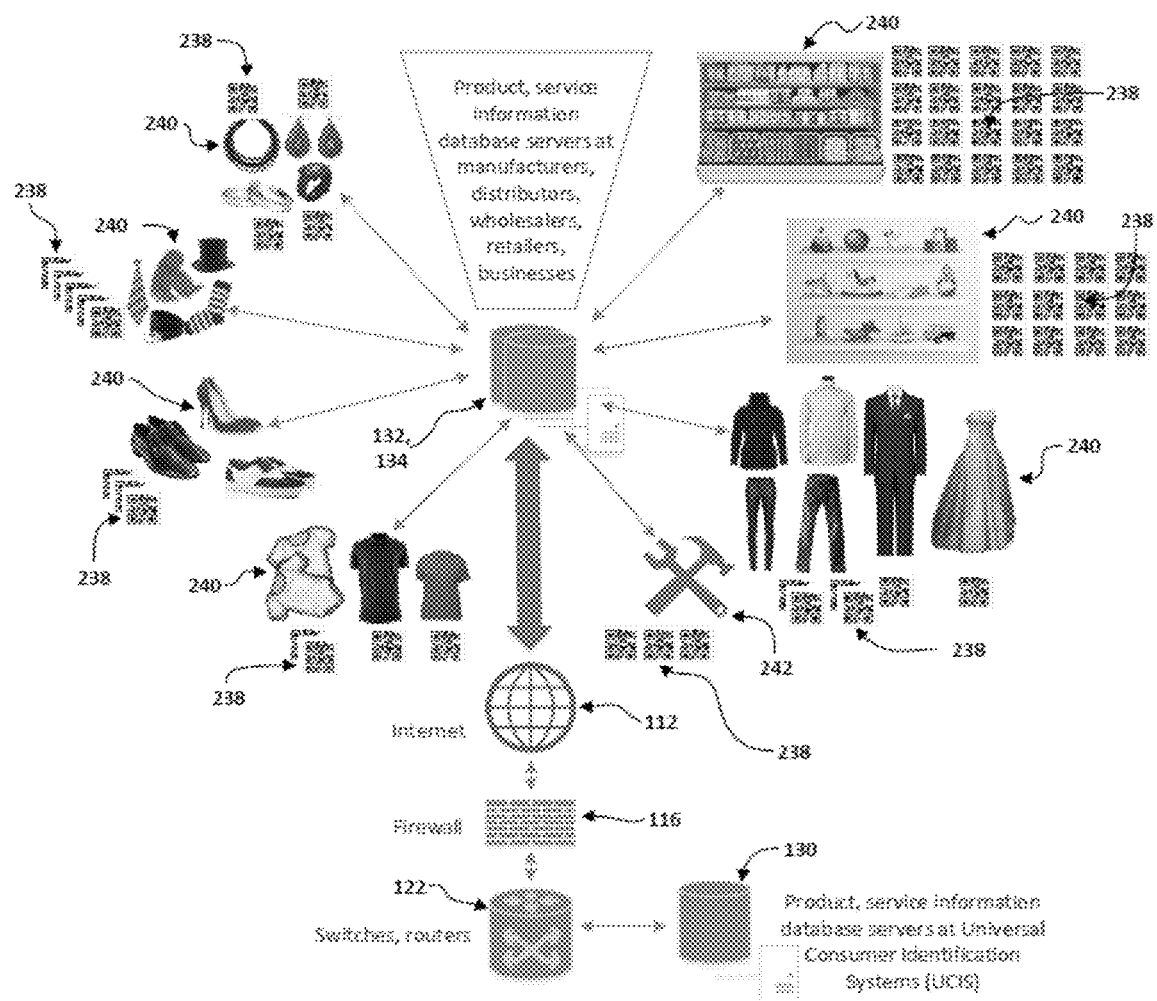
FIG. 7 illustrates the exemplary non-limiting system, method, and apparatus of the collected product and service information from third parties being exchanged with the Universal Consumer Identification Systems (UCIS)

FIG. 7 illustrates the products 240 with associated UQR tags 238 that contain specific, accurate and granular information about the products from the designers, manufacturers, distributors, wholesalers, merchants, businesses, and third parties who have access to such information to be sent from their product, service information database servers 132, 134 in FIG. 1 to the product, service information database servers 130 in the UCIS. The exchange of information goes through the Internet 112, the firewall 116, switches and routers 122, and other related hardware, software components.

FIG. 8 illustrates product information database servers 132 at manufacturers, distributors, wholesalers, merchants, and service information database servers 134 at businesses, which are indexed and categorized to include and differentiate at least:

| | |
|---|---|
| Product/Service ID | (244) |
| Product/Service category | (246) |
| Description | (248) |
| Gender | (250) |
| Age | (252) |
| Hat size | (254) |
| Neck size | (256) |
| Shoulder size | (258) |
| Sleeve size | (260) |
| Calf size | (262) |
| Bicep size | (264) |
| Forearm size | (266) |
| Wrist size | (268) |
| Ring size | (270) |
| Chest/Bust size | (272) |
| Waist size | (274) |
| Hip size | (276) |
| Back neck to waist size | (278) |
| Rise size | (280) |

| | |
|---|---|
| Inseam size | (282) |
| Thigh size | (284) |
| Foot size | (286) |

Product/Service ID 244 is automatically generated by the product information database servers 132 to create a string of characters. Each product and service is assigned with the unique Product/Service ID 244.

Figure 9:
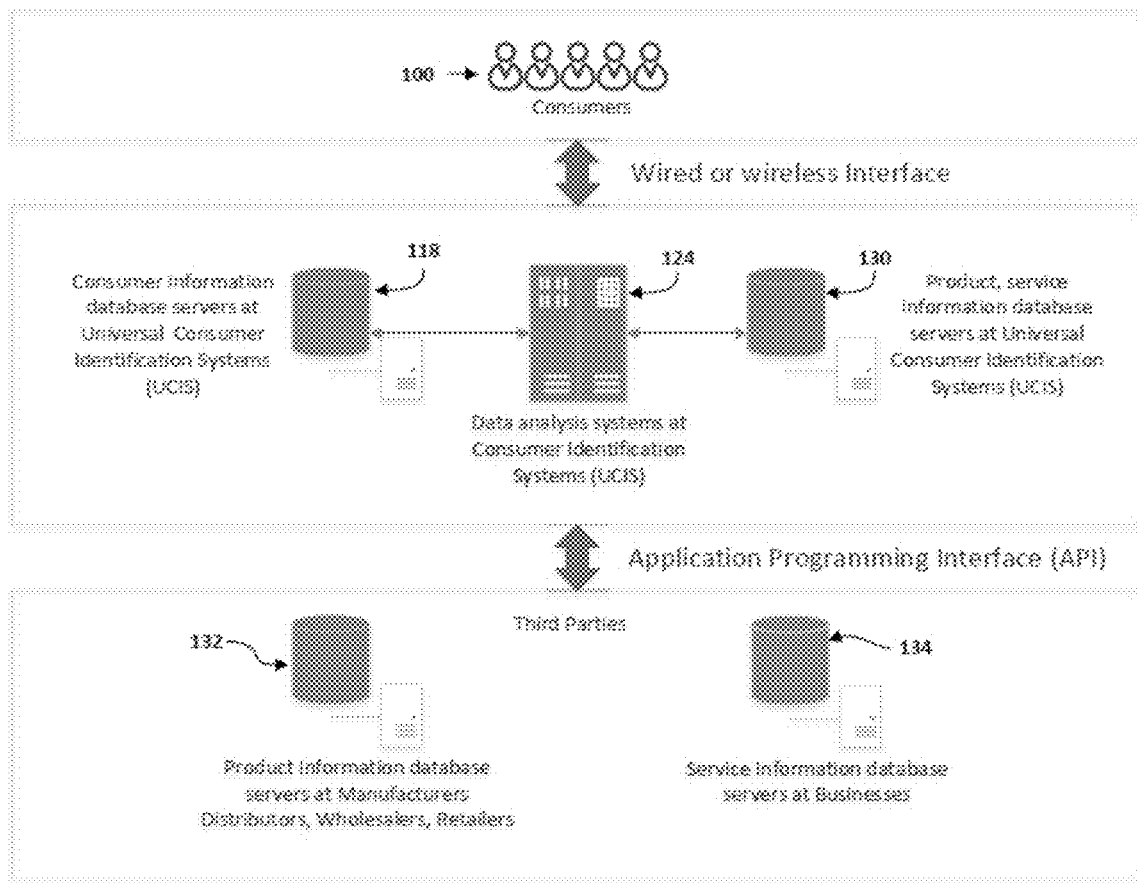
FIG. 9 illustrates the exemplary non-limiting system, method, and apparatus of Interactions between third-parties and Universal Consumer Identification Systems (UCIS); between Consumers and Universal Consumer Identification Systems (UCIS)

FIG. 9 illustrates at least three main groups that share consumer, product, and service information across systems and networks. From top to bottom, the first group of computers and smart devices 102-110 in FIG. 1 that belong to the consumers 100. The second group of systems in the UCIS location that comprise the consumer information database servers 118, the data analysis systems 124, the product, service information database servers 130. The third group of systems at third parties' location that comprise the product information database servers 132 and service information database servers 134. Information or data is exchanged between the consumers and UCIS and between third parties and UCIS using at least an application programming interface (API) via wired or wireless connectivity.

Figure 10:
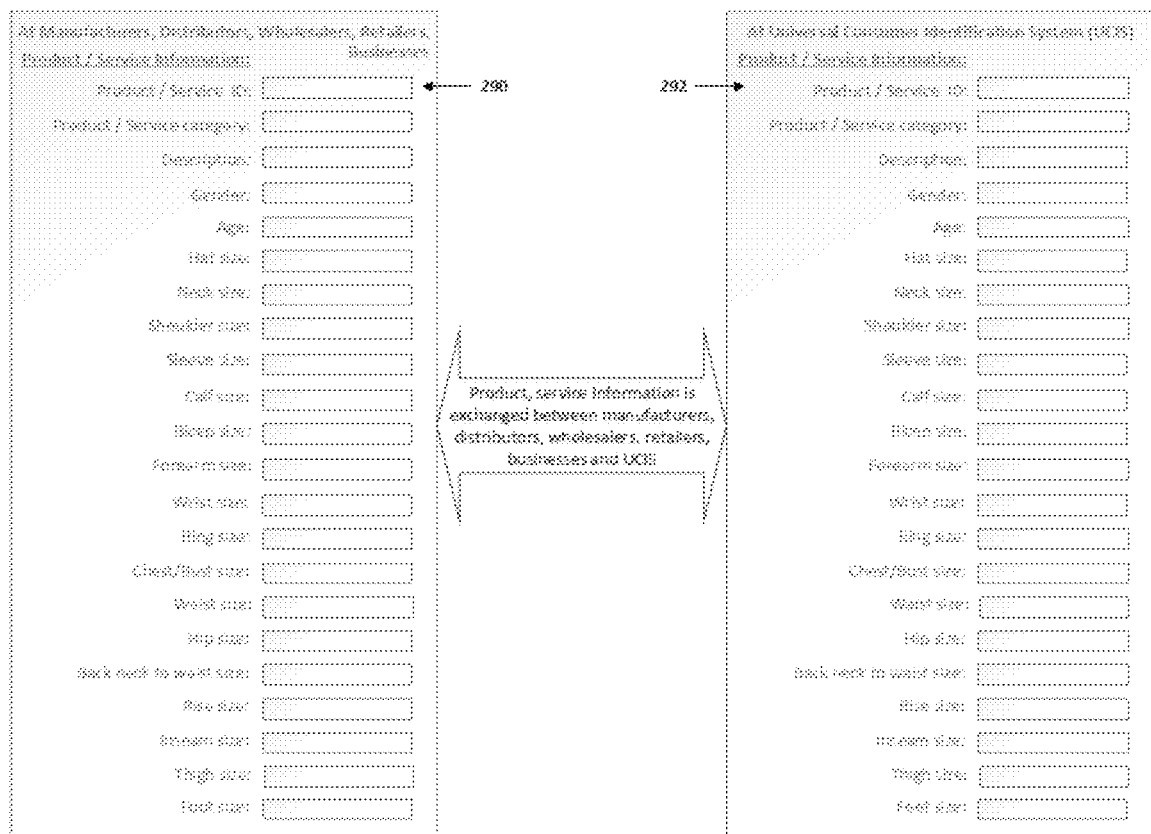
FIG. 10 illustrates the exemplary non-limiting system, method, and apparatus of the granular data being exchanged between third parties and the Universal Consumer Identification Systems (UCIS)

FIG. 10 illustrates the granular information of products and services is exchanged between product information database servers 132, service information database servers 134 and the product, service information database servers in the UCIS 130. The unique Product or Service Identification number at the third parties 290 and at the UCIS 292 is identical between the third party databases and the UCIS's databases is synchronized so that each record with specific elements or measurements 244-286 in FIG. 8, as illustrates in the registration form 156 in FIG. 4, are up-to-date and consistent. Each record of products and services can be created in product information database servers 132 in FIG. 1, service information database servers 134 in FIG. 1 and sent to the product, service information database servers in the UCIS 130 in FIG. 2. The product, service information database servers in the UCIS 130 in FIG. 2 can create product, information records and send to the product information database servers 132 in FIG. 1, service information database servers 134 in FIG. 1.

Figure 11:
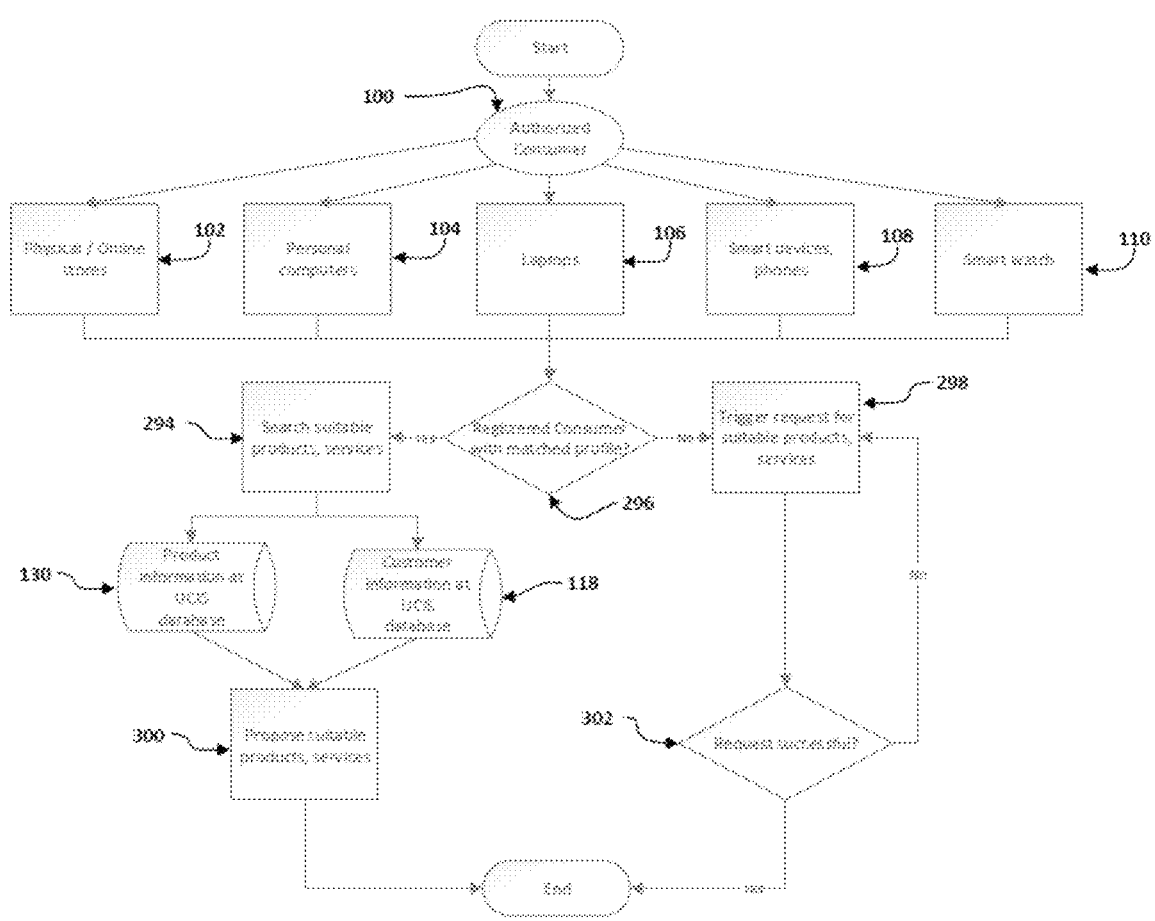
FIG. 11 illustrates the exemplary non-limiting system, method, and apparatus of a flowchart of searching, matching, and proposing processes for products, services.

FIG. 11 illustrates a data flow diagram that comprises the consumers 100 who have authorized access to the UCIS using various computers and smart devices 102-110 in FIG. 1. After the consumers 100 logged into the UCIS and their profiles matched information in the UCIS database 118 in FIG. 1, a process 294 in FIG. 11 would automatically search for suitable products and services from the consumer information databases 118 in FIG. 1 and the product information database 130 in FIG. 2 in the UCIS. Process 300 would return suitable products, services to the consumers for viewing. However, if process 300 does not find any suitable products, services in the databases 118 in FIGS. 1 and 130 in FIG. 1, process 298 would be triggered to request suitable products and services from the third parties using the consumer's registered profile. The request for suitable products and services is posted 302 to the third parties until at least a suitable product or service is found.

Figure 12:
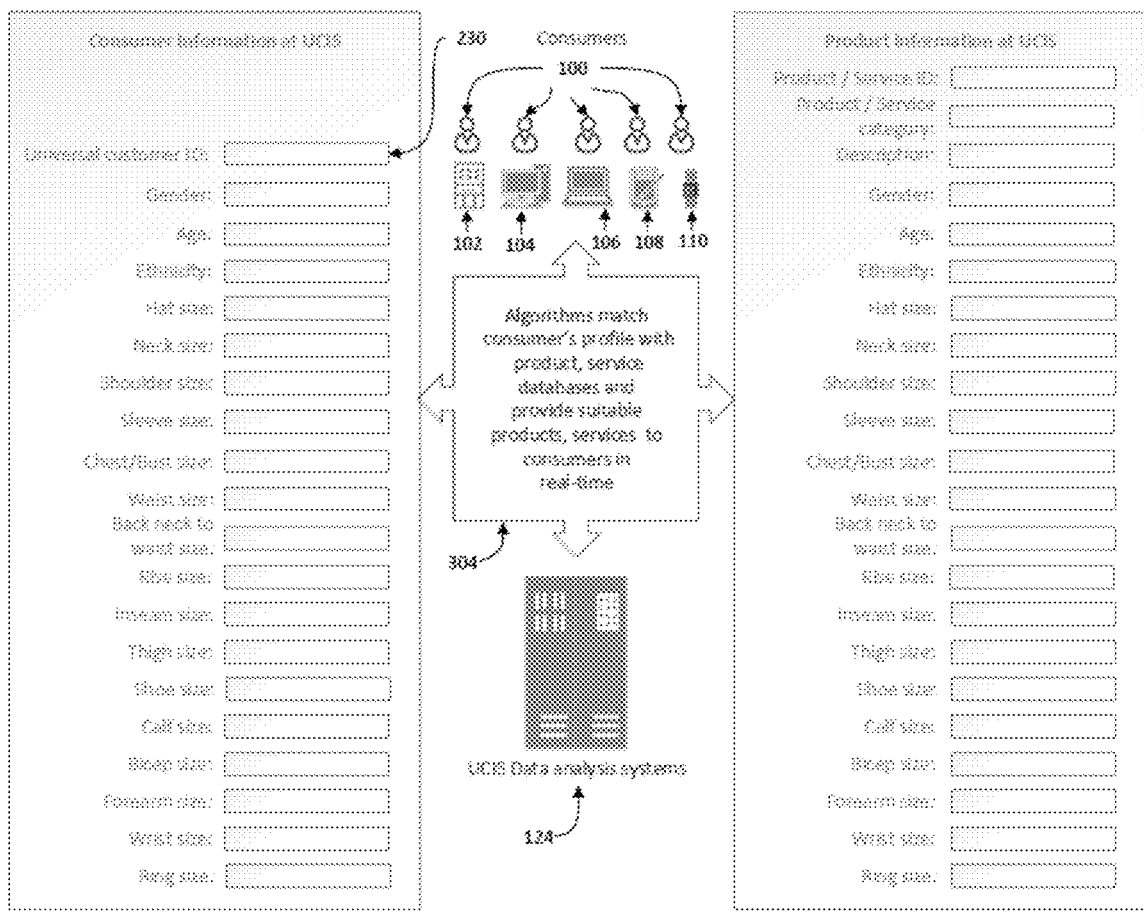
FIG. 12 illustrates the exemplary non-limiting system, method, and apparatus of algorithms for matching consumers' profile with product, service information and provide matching products, services to consumers in real-time.

FIG. 12 illustrates the consumers 100 are at a physical store, business 102 search for merchandises or services. The consumers 100 can also use a computer 104, a laptop 106, a smart device 108, or a smart watch 110 to access the UCIS or an online store 102. The UCIS Data Analysis Systems 124 in FIG. 1 would process algorithms 304 to compare suitable elements and measurements 174-222 in FIG. 5 in the consumer information databases 118 in FIG. 1, using the universal consumer identification 230 in FIGS. 6A and 6B, with product information databases 130 in FIG. 1. The result of the suitable products and services of are returned to the consumers 100.

Figure 13:
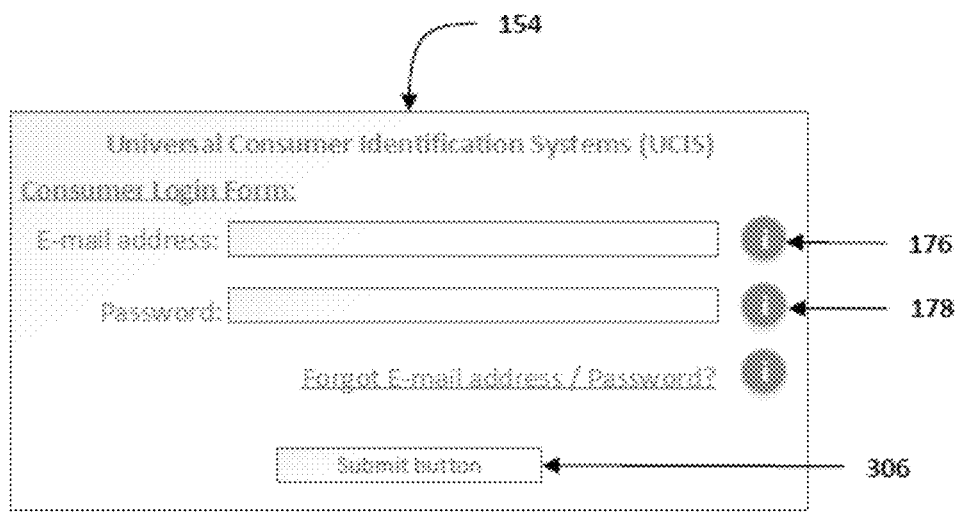
FIG. 13 illustrates the exemplary non-limiting system, method, and apparatus of the login form for the authorized consumer.

FIG. 13 illustrates the login form 154 in FIG. 4 for the registered consumers 100 to access the UCIS by filling out the e-mail address 176 and password 178 fields in FIG. 5. The registered consumer 100 clicks on the submit button 306 to initiate the process 162 in FIG. 4 to verify their registered profiles. The consumers 100 would be granted access 164 in FIG. 4 to the UCIS if provided access information is valid.

Figure 14A:
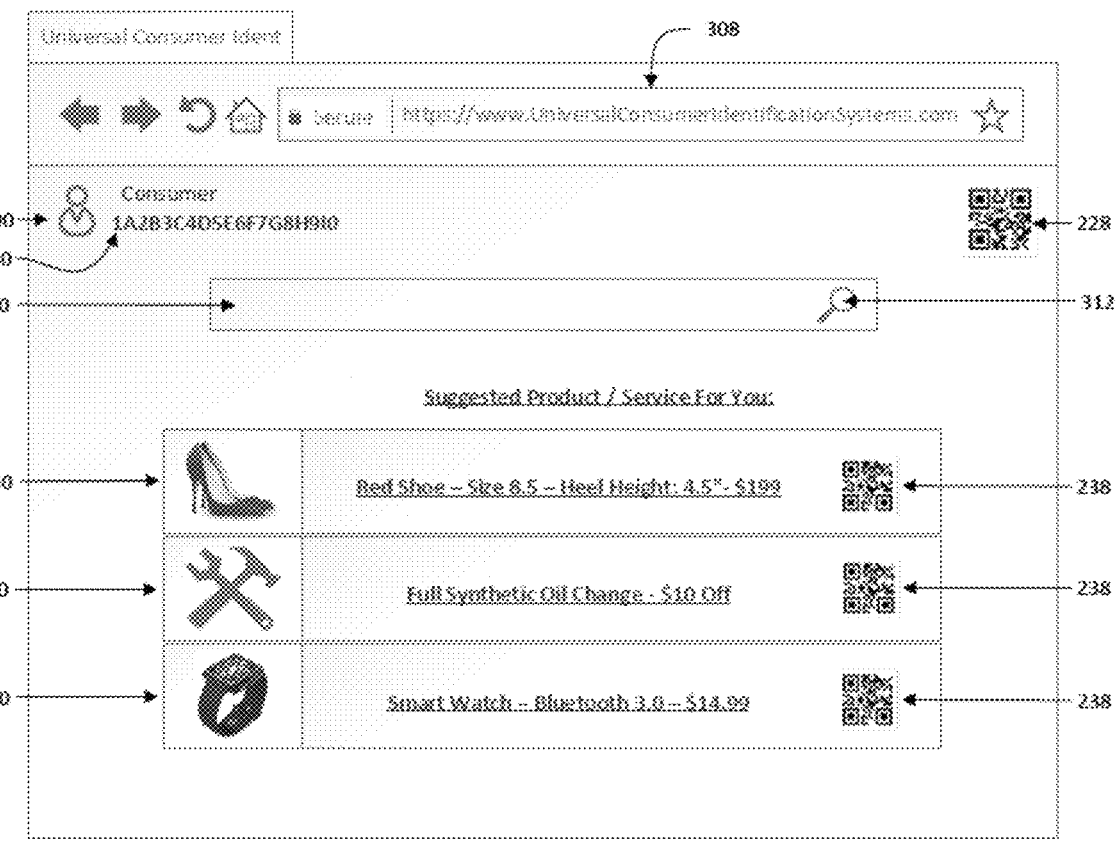
FIG. 14A illustrates the exemplary non-limiting system, method, and apparatus of authenticated consumers are allowed to automatically access matching products, services based on their registered profiles via a web browser.

FIG. 14A illustrates the web page with a hypothetical universal resource locator (URL) 308. The top left of the web page is consumer 100 with the universal consumer identification (UCID) number 230 in FIGS. 6A and 6B. On the right, is representation of the universal consumer identification (UCID) 230 in the graphical form of the UCIDQR code 228. The search field 310 is where the consumer 100 enter keywords to search for specific products and services by clicking on the magnification glass 312 or simply tab on the return key on the keyboard. Below is the list of a pair of women heels, a smart watch, and a service 240 with associated products and services identification numbers in the form of the UQR tags 238.

Figure 14B:
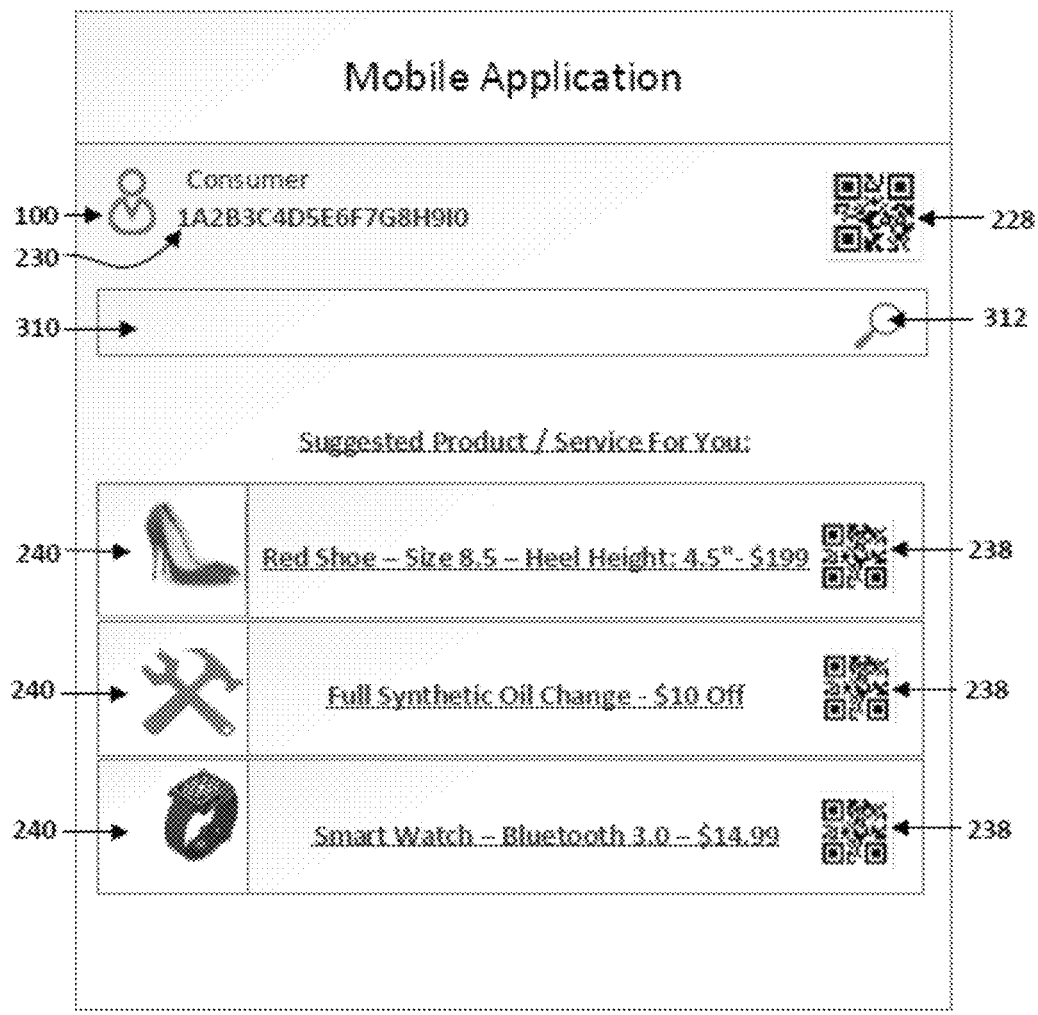
FIG. 14B illustrates the exemplary non-limiting system, method, and apparatus of authenticated consumers are allowed to automatically access matching products, services based on their registered profiles via a mobile application.

FIG. 14B illustrates the mobile application for mobile devices with the view and information that is similar to FIG. 14A.

Figure 15A:
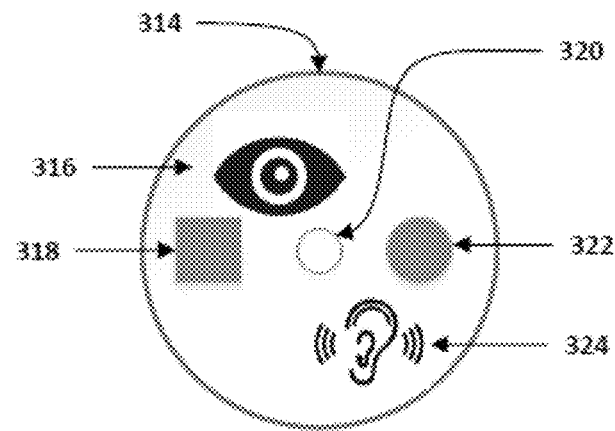
FIG. 15A illustrates the exemplary non-limiting apparatus of the top view of a wireless apparatus to provide visual and/or audible alert for matching products, services.

FIG. 15A illustrates the top view of a battery power operated apparatus called wireless Universal Smart Alert (USA) 314 with a surface-mount light emitting diode (LED) 318 and a speaker 322. Embodiment 316 symbolizes the LED 318 and embodiment 324 symbolizes the speaker 322. The LED 318 and speaker 322 can be manually and independently enabled or disabled by the third party's computer systems or by the UCIS. The USA has a cavity 320 at the center to allow a circular object to go through.

Figure 15B:
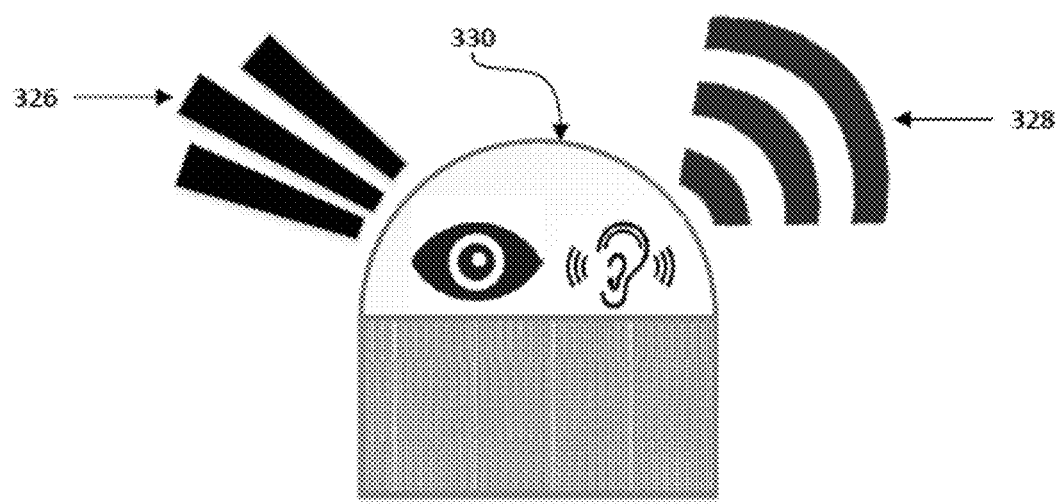
FIG. 15B illustrates the exemplary non-limiting apparatus of side view of a wireless apparatus to provide visual and/or audible alert for matching products, services.

FIG. 15B illustrates the side view of the wireless Universal Smart Alert (USA) 314 with embodiment 326 represents a visual alert and embodiment 328 represents an audible alert being active with a translucent or a transparent dome 330.

Figure 16A:
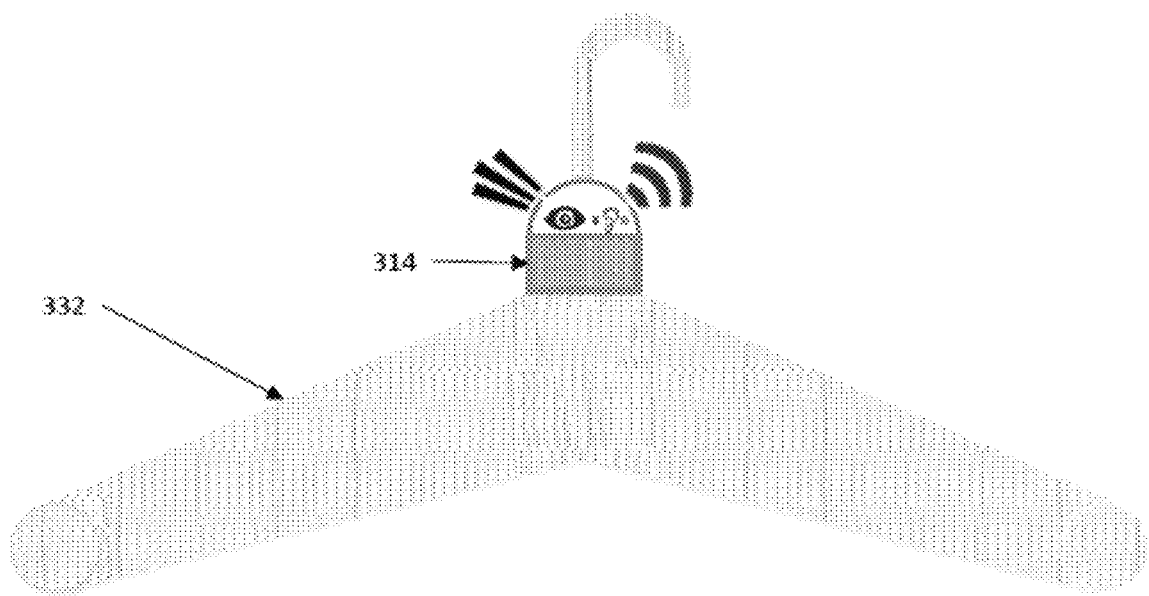
FIG. 16A illustrates the exemplary non-limiting USA wireless apparatus attached to a clothes hanger.

FIG. 16A illustrates the wireless Universal Smart Alert (USA) 314 that is attached to a clothes hanger 332 in active mode by sending out visual and audible alerts.

Figure 16B:
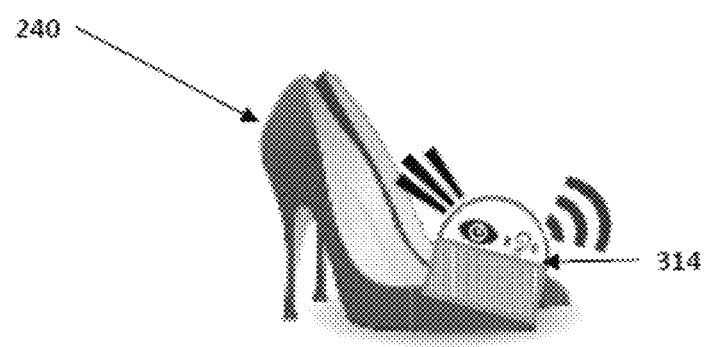
FIG. 16B illustrates the exemplary non-limiting USA wireless apparatus attached to a pair of women heels.

FIG. 16B illustrates the wireless Universal Smart Alert (USA) 314 in active mode that is attached to a pair of women heels 240.

Figure 17:
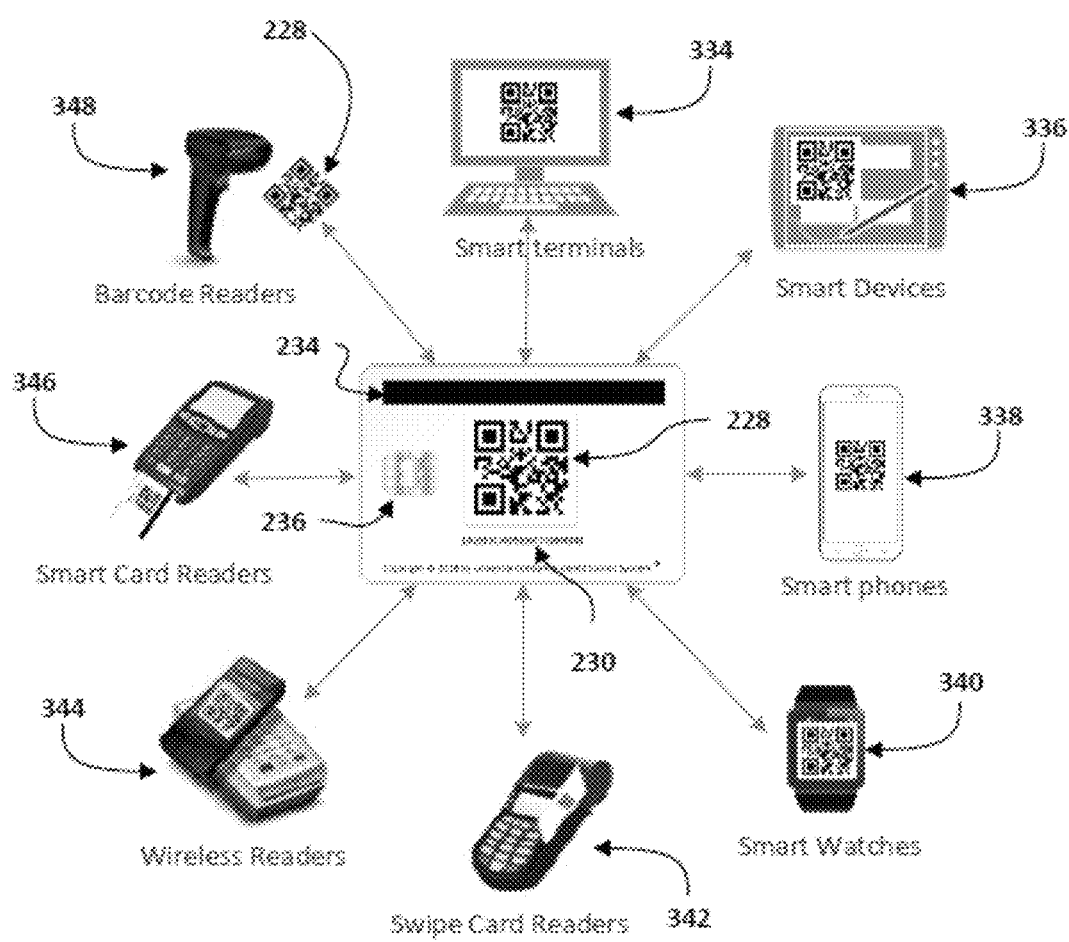
FIG. 17 illustrates the exemplary non-limiting system, method, and apparatus of the Universal Consumer Identification (UCID) being generated and read in physical and electronic forms.

FIG. 17 illustrates the Universal Consumer Identification (UCID) can be used at a kiosk 334 in a retail store. The consumers can personally enter their UCID number via a keyboard or scan their UCID card with a scanning device or smart reader. The staff at a retail store or a business can use a tablet 336, smart phone 338 to assist the consumers 100 in finding suitable products and services by entering the UCID number 230 in FIGS. 6A and 6B or scanning the UQR code 228 in FIGS. 6A and 6B. The consumers 100 can retrieve their UCIDQR code 228 on a smart watch 340 for scanning and finding suitable products and services. The UCID card comprises a magnetic stripe 234 in FIG. 6B, a smart chip 236 in FIG. 6B, a UQR code 228 in FIGS. 6A and 6B, and a string of alphanumeric characters 230 in FIGS. 6A and 6B. These various features allow the consumers 100 to use the UCID card with a card reader 342, a wireless reader 344 by using Bluetooth, Near Field Communication (NFC) protocols, or a smart chip reader 346, or a handheld barcode scanner 348 that can read UQR codes 228 in FIGS. 6A and 6B associated to products or services.

Figure 18:
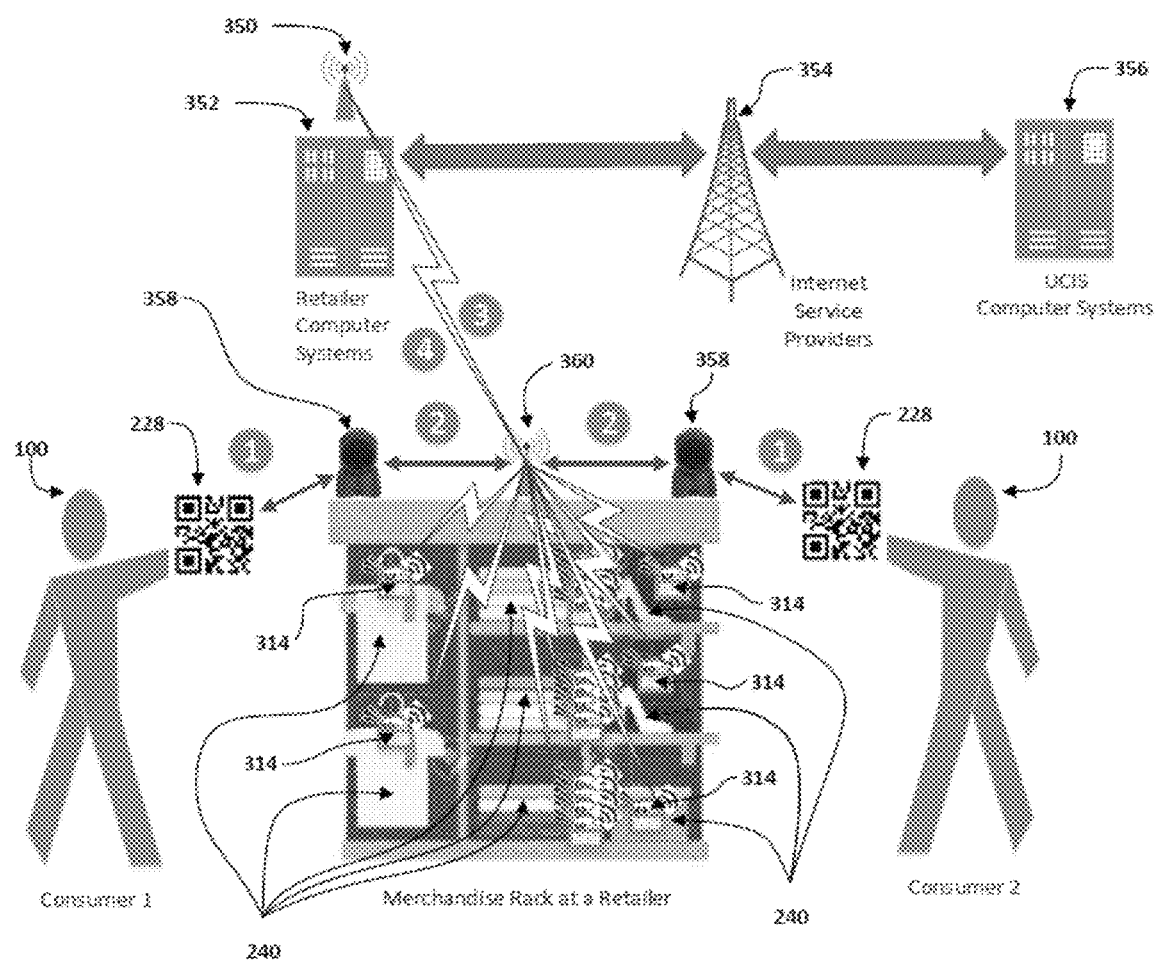
FIG. 18 illustrates the exemplary non-limiting system, method, and apparatus of the Universal Consumer Identification (UCID) to find matching products at a store using a QR tag reader.

FIG. 18 illustrates a typical example of the consumers 100 that use the QR code scanner 358 inside a retail store that is located at the shelves with merchandises 240 in FIG. 7 to read their UCIDQR codes 228 (step 1). The retailer computer systems 352 would send the scanned UCIDQR codes via a wireless access point 360 located near the products (step 2) to initiate a search for a suitable merchandise to the retailer computer systems 340 (step 3) via a wireless access point 350 near the computer systems. The Universal Smart Alert (USA) 314 that is attached to the suitable merchandise 240 would be activated to send out (step 4) a visual and/or audible alerts when the retailer's computer systems 352 find the suitable merchandise. The product information and availability at the retailer's computer systems 340 would be up-to-date since these systems are in constant communications with the UCIS computer systems 356 through an internet service provider 354.

Figure 19:
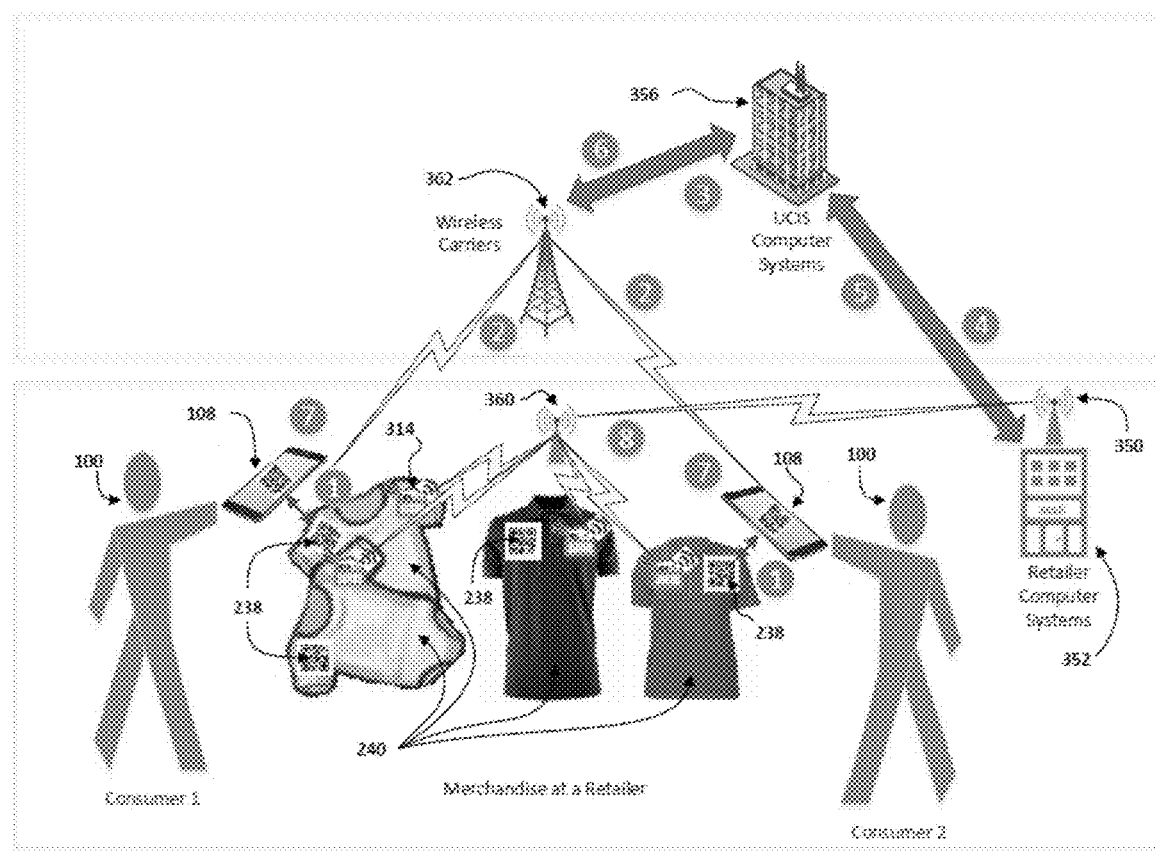
FIG. 19 illustrates the exemplary non-limiting system, method, and apparatus of Interactions between consumers and products or services while in transit.

FIG. 19 illustrates a typical example of the consumers 100 that use the mobile application installed on their smart phones 108 to find a suitable product. The consumers would use their smart phones to scan the UQR tags 238 that are attached to merchandises 240 (step 1). The mobile application on the smart phone 108 sends the UQR tag 238 via their wireless provider 362 (step 2) to UCIS computer systems 356 (step 3). The UCIS computer systems 356 would typically be in constant communications with the retail computer systems 352 to exchange product information and availability (steps 4 and 5). The result would be returned to the wireless provider 362 (step 6) and to the mobile application (step 7). The retail computer systems 352 would also send a signal 350 (step 8) to activate the USA 314 if the UQR tag 238 on the merchandise matches the profile of the consumers 100.

Figure 20:
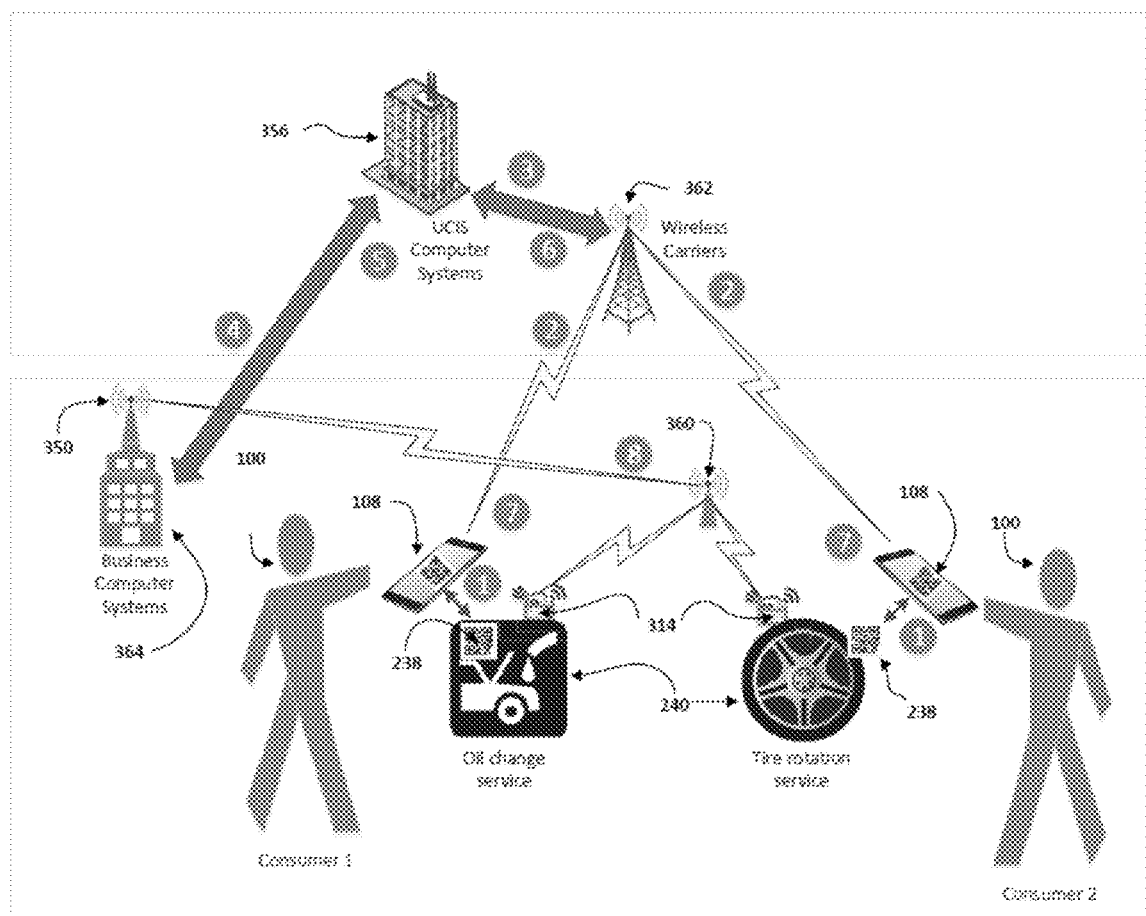
FIG. 20 illustrates the exemplary non-limiting system, method, and apparatus of Interactions between consumers and products at a store using a smartphone.

FIG. 20 illustrates a typical example of the consumers 100 that use the mobile application installed on their smart phones 108 to find desired services by scanning the UQR tags 238 that are attached to digital or physical service signs 240 in the business (step 1). The mobile application on the smart phones 108 send the UQR tag 238 via their wireless provider 362 (step 2) to UCIS computer systems 344 (step 3). The UCIS computer systems 344 would typically be in constant communications with the business computer systems 364 to exchange service information and availability (steps 4 and 5). The result would be returned to the wireless provider 362 (step 6) and to the mobile application (step 7) on the smart phones 108. The business computer systems 364 would also send a signal (step 8) to activate the USA 314 if the UQR tag 238 on the service matches the desired service request in the profile of the consumers 100.

Figure 21:
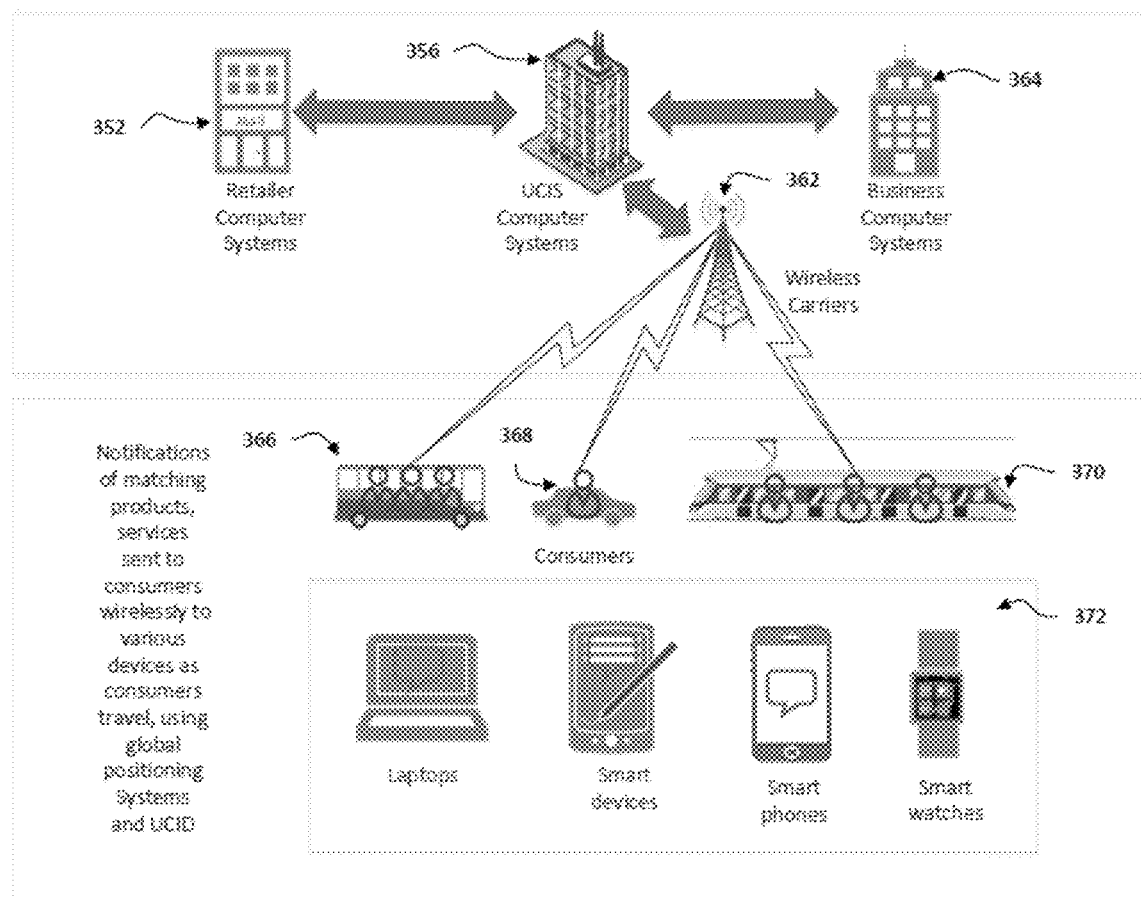
FIG. 21 illustrates the exemplary non-limiting system, method, and apparatus of Interactions between consumers and services at a business using a smartphone.

FIG. 21 illustrates a typical example of the consumers 100 in buses 366, own cars 368, trolleys 370, or in transit that are provided with constant communications and notifications from the UCIS computer systems 356 which are also in constant communications with the merchant computer systems 352 and business computer systems 364 to exchange current products and services information. The consumers 100 use mobile application or their own devices 372 to connect wirelessly with the UCIS computer systems 356 via their wireless service provider 362 to find merchants and businesses that have suitable products and services as the consumers 100 travel nearby, using the global positioning systems (GPSs).

Conclusion, Ramifications, and Scope

Although specific embodiments of the present invention have been disclosed, it is to be understood that various modifications are possible and are contemplated within the true spirit and scope of the appended claims. There is no intention, therefore, of limitation to the exact abstract or disclosure herein presented.

The scope of the present invention is further entailed in the claims below.

I claim:

1. A method of proposing at least one suitable product to a consumer, comprising:
   (a) registering, via an application on a computer or a consumer's smart device, information about the consumer, and one desired product, wherein the information about the consumer includes:
   an alias, email address, password, phone number, gender, age, ethnicity, personal measurements comprising of: hat size, neck size, shoulder size, sleeve size, calf size, bicep size, forearm size, wrist size, ring size, chest/bust size, waist size, hip size, back neck to waist size, rise size, inseam size, thigh size, and foot size;
   (b) storing, on a consumer information database server, the registered information about the consumer;
   (c) generating, by a universal consumer identification system (UCIS), a universal consumer identification (UCID),
   wherein the UCID is a quick response (QR) code presented on the computer or the consumer's smart device, associated to a non-personally identifiable profile, used globally at participating retailers as a first factor authentication, and comprises of:
   the personal measurements and the one desired product registered in step (a);
   (d) storing, on a product information database server, information about at least one product from a third party's product information database server, including:
   an identification of the at least one product,
   a category of the at least one product comprising of: female clothing, male clothing, appropriate age group, shoe, ring, or hat, and
   a description of the at least one product comprising of hat size, neck size, shoulder size, sleeve size, calf size, bicep size, forearm size, wrist size, ring size, chest/bust size, waist size, hip size, back neck to waist size, rise size, inseam size, thigh size, or foot size;
   (e) analyzing, by a data analysis system, the information about the consumer in step (a), and the information about the at least one product in step (d);
   (f) proposing, by sending an alert via an apparatus, the at least one suitable product to the consumer, the at least one suitable product comprising of the at least one product from the third party's product information database server matching at least one of the personal measurements and the one desired product in step (a), wherein the apparatus is
   the computer, or
   the consumer's smart device, or
   a Universal Smart Alert (USA) mounted on a product at a retailer, said USA comprises of a battery-operated device to notify the consumer with an audible alert from a built-in speaker, and/or a visual alert from a light emitting diode, or
   a Universal Quick Response (UQR) tag attached to the product at the retailer, said UQR tag contains the information about the at least one product described in step (d); and
   (g) processing, by the UCIS, a financial transaction securely, by using the first factor authentication, a second factor authentication, comprising of a random code consisting of alphanumeric characters generated by the UCIS and sent to the computer or the consumer's smart device via text messaging, or email, and a third factor authentication, comprising of a random code sent by a financial company to verify the consumer's identification via text messaging, or email.

2. The method of claim 1, wherein when the apparatus is the computer, the alert is displayed on the computer;

when the apparatus is the consumer's smart device, the alert is displayed on the consumer's smart device;

when the apparatus is the USA:
  (1) the proposing of the at least one suitable product to the consumer is performed in response to presenting the QR code to a barcode reader at the retailer, and
  (2) the alert is displayed on the USA,
  wherein the USA further comprises a function to enable or disable the visual or audible alerts; and when the apparatus is the UQR:
  (1) the proposing of the at least one suitable product to the consumer is performed in response to scanning of the UQR tag using a mobile application installed on the consumer's smart device, and
  (2) the alert is displayed in the mobile application.

* * * * *